3,546,222
N,N'-TRIAZINYL PERYLENE-3,4,9,10-TETRA-
CARBOXYLINE ACID BIS IMIDES
Francis Irving and Donald Graham Wilkinson, Manchester, England, assignors to Imperial Chemical Industries Limited, London, England, a corporation of Great Britain
No Drawing. Filed Mar. 11, 1968, Ser. No. 711,883
Claims priority, application Great Britain, Mar. 15, 1968, 12,172/67
Int. Cl. C07d 55/22
U.S. Cl. 260—249.6                6 Claims

ABSTRACT OF THE DISCLOSURE

Perylene-3,4,9,10-tetracarboxylic acid bis-imides, valuable as pigments, are prepared by interaction of perylene-3,4,9,10-tetracarboxylic acid or a functional derivative thereof and 2-amino-1,3,5-triazines carrying amino, substituted amino or aryl substituents in the 4 and 6 positions.

This invention relates to new imides and more particularly to bis-imides obtained from perylene-3,4,9,10-tetracarboxylic acid and 1,3,5-triazines containing at least one primary amino group useful as pigments.

According to the invention there are provided new imides of the formula:

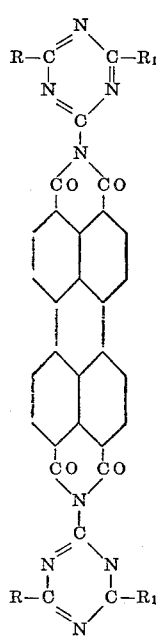

wherein R and $R_1$, which may be the same or different, each represent an amino or substituted amino group, or an aryl or substituted aryl group.

As examples of substituted amino groups which may be represented by R or $R_1$ there may be mentioned amino groups in which one or both hydrogen atoms are replaced by alkyl groups, preferably lower alkyl groups such as methyl, ethyl and other alkyl groups containing up to 4 carbon atoms, by substituted alkyl groups such as hydroxyalkyl for example, $\beta$-hydroxyethyl and $\gamma$-hydroxypropyl, alkoxyalkyl for example, $\beta$-ethoxyethyl, chloroalkyl for example $\beta$-chloroethyl, by alkylene groups such as allyl, by aralkyl groups such as benzyl and especially by aryl groups such as phenyl and p-tolyl and also amino groups in which the hydrogen atoms are replaced by a divalent group which together with the nitrogen atom forms a heterocyclic ring such as a piperidino, morpholino and carbazyl.

As aryl or substituted aryl which may be represented by R or $R_1$ there may be mentioned for example phenyl, p-tolyl, p-chlorophenyl, p-methoxyphenyl and m-chlorophenyl.

Particularly valuable pigments include those in which R and $R_1$ are both amino groups, an amino and a phenyl group, an amino and an anilino group, an amino and a p-chloroanilino group, and an amino and a 2-hydroxy-naphth-1-yl group.

According to a further feature of the invention there is provided a process for the manufacture of new imides of the invention which comprises reacting perylene-3,4,9,10-tetracarboxylic acid or a functional derivative thereof with a triazine of formula

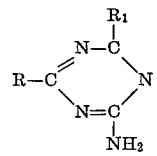

wherein R and $R_1$ have the meanings given hereinbefore in the presence of a zinc or cadmium compound.

The process of the further feature of the invention may be conveniently carried out by heating perylene-3,4,9,10-tetracarboxylic acid dianhydride with the triazine (preferably between two and three times the molar amount of the tetracarboxylic acid anhydride) in a high boiling solvent such as quinoline, nitrobenzene, cresols, or chloronaphthalene at temperatures between 180 and 280° C., and preferably between 200 and 240° C.

The zinc or cadmium compound is preferably a zinc or cadmium phenate, cresylate, sulphonate such as p-toluene-sulphonate, sulphite, borate, or salt of an organic carboxylic acid such as acetic acid.

The imide formed is generally insoluble in the solvent after cooling and may be isolated, for example by filtration, and purified by washing if necessary with aqueous acid and aqueous sodium carbonate to remove unreacted aminotriazine and perylene tetracarboxylic acid respectively.

As a functional derivative of perylene tetracarboxylic acid there may be mentioned for example the tetracarboxylic acid dianhydride.

After isolation the imides are converted by conventional methods into a form suitable for use as pigments for example by grinding, alone or in conjunction with auxiliary agents, agitating with particulate grinding elements, or by pasting with solvents.

The imides are suitable for the pigmentation of paints, lacquers, inks and natural and synthetic polymeric materials for example resulting from polymerisation, polyaddition or polycondensation reactions. The pigments may be incorporated into the medium in any conventional way, for example by dispersing in paints, inks and lacquers, or compounding with the polymeric material while this is in a plastic or fluid state, for example as in the mass pigmentation of artificial fibres, such as viscose, or synthetic fibres such as polyamides or polyesters such as polyethylene terephthalate by addition of the pigment to the polymeric material before spinning. The pigments are also of value for use in conjunction with scarlet chromes in order to give a bluer shade. The pigments may also be used for pigment printing in for example textiles, and for the coloration of polymeric materials such as polyethylene and polyvinyl chloride.

The colorations obtained are of bright bluish-red of very high tinctorial value and are of high fastness to heat, light, weathering and solvents, free from tendency to migrate and fast to "overspray."

The invention is illustrated but not limited by the following examples in which all parts and percentages are by weight unless otherwise stated.

EXAMPLE 1

A mixture of 49 parts of perylene-3,4,9,10-tetracarboxylic acid dianhydride, 63 parts of melamine, 25 parts of zinc acetate dihydrate and 500 parts of quinoline is stirred at a temperature between 230 and 240° C. in a stream of nitrogen for 3 hours. After cooling, the insoluble product is collected by filtration, washed with a little quinoline, and then with ethanol. It is then purified by extraction at 90–95° C. with dilute hydrochloric acid and then with dilute sodium carbonate at 90–95° C., washed free from alkali with water and dried. About 74 parts of perylene-3,4,9,10-tetracarboxylic acid bis(3',5'-diamino-s-triazine imide), a bright bluish red product, are so obtained. It dissolves in concentrated sulphuric acid to a deep violet solution.

4 parts of this product are milled in about 40 parts of methanol with 200 parts of No. 8 Ballotini glass beads (about 0.4 mm. diameter for 2 hours by the method described in Examples 1 and 2 of U.K. patent specification No. 956,515. A bright intense bluish red pigment is so obtained. When used in surface coatings shades of bright bluish red are produced which show excellent fastness to solvents, heat, light and exposure to the weather. It can also be used for the mass coloration of plastic materials and artificial fibres.

EXAMPLE 2

A mixture of 49 parts of perylene-3,4,9,10-tetracarboxylic acid dianhydride, 63 parts of melamine, 18 parts of zinc oxide and 22 parts of phenol is stirred at a temperature between 230 and 240° C. with 500 parts of quinoline for 3 hours in a stream of nitrogen. On cooling the product is filtered and washed with a little quinoline, then with ethanol. It is suspended in water and extracted at 90–95° C. with excess dilute hydrochloric acid, filtered, washed and then extracted similarly with dilute sodium carbonate solution at 90–95° C. It is finally filtered, washed free from alkali and dried. A bright bluish red product is so obtained which when milled as described in Example 1 gives a bright bluish red pigment very similar in properties to the pigment of that example.

EXAMPLE 3

49 parts of perylene-3,4,9,10-tetracarboxylic acid dianhydride, 93 parts of 2,4-diamino-6-phenyltriazine and 25 parts of zinc acetate dihydrate are added with stirring to 500 parts of quinoline and the whole is then stirred at a temperature between 230 and 240° C. in a stream of nitrogen for 3 hours. On cooling the red product is filtered, washed with quinoline and then with ethanol. It is then suspended in about 5000 parts of dilute hydrochloric acid and stirred at 90–95° C. for ½ hour. It is filtered, washed acid free and then extracted in a similar manner with dilute sodium carbonate solution at 90–95° C. After filtration, and washing free from alkali it is dried. About 77.5 parts of perylene-3,4,9,10-tetracarboxylic acid bis-(3'-amino-5'-phenyl-s-triazinylimide), a bright bluish red powder, are so obtained. It is converted into pigmentary form by milling as described in Example 1. A bright bluish red pigment of excellent fastness properties to heat, light and solvents is so obtained.

The same pigment is obtained when the reaction is carried out using 31.4 parts of cadmium acetate in place of the zinc acetate. It is also obtained using an equivalent amount of zinc sulphite in nitrobenzene or zinc borate in quinoline, the reactions being carried out in a stream of nitrogen for 5 hours at the boiling point.

A very similar pigment with excellent fastness properties is obtained if in place of the diaminophenyltriazine used in this example 110 parts of 2,4-diamino-6-(p-chlorophenyl)triazine are used.

EXAMPLE 4

A mixture of 49 parts of perylene-3,4,9,10-tetracarboxylic acid dianhydride, 96 parts of 2,4-diamino-6-piperidinotriazine and 25 parts of zinc acetate dihydrate is stirred with 500 parts of quinoline at a temperature between 230 and 240° for 3 hours in a stream of nitrogen. Perylene - 3,4,9,10-tetracarboxylic acid bis(3'-amino-5'-piperidino-s-triazinylimide), a red product, is isolated and purified as described in the preceding examples. On milling it is converted into a bright red pigment of high tinctorial strength and excellent fastness properties.

EXAMPLE 5

A mixture of 31 parts of perylene-3,4,9,10-tetracarboxylic acid dianhydride, 58 parts of 2-amino-4,6-bis-(dimethylamino)triazine and 16 parts of zinc acetate dihydrate is stirred with 320 parts of quinoline at a temperature between 230 and 240° for 3 hours in a stream of nitrogen. On cooling the red crystalline product is filtered off, washed with quinoline and then with alcohol. The perylene-3,4,9,10-tetracarboxylic acid bis[3'',5'-bis-(dimethylamino)-3-triazinylimide] is then extracted with excess dilute hydrochloric acid at 90–95° C., filtered, washed neutral and then extracted with dilute sodium carbonate solution at 90–95° C. Finally it is washed neutral and dried. When milled as described in Example 1 a bright bluish red pigment is obtained, which when incorporated into paints or other surface coating gives bright bluish red shades of excellent fastness to heat, light and solvents and excellent resistance to change on exposure to the weather. It can also be used for the mass coloration of plastic materials or artificial fibres.

EXAMPLE 6

A mixture of 49 parts of perylene-3,4,9,10-tetracarboxylic acid dihydride, 41 parts of melamine and 46 parts of zinc p-toluenesulphonate is stirred with 55 parts of quinoline at 250–260° in a stream of nitrogen for 5 hours. On cooling, the reaction product is filtered, washed with ethanol and then heated at 90–95° C. with about 3000 parts of dilute hydrochloric acid for 15 minutes. It is then filtered, washed and dried. On milling as described in Example 1 a very similar pigment to that of Example 1 was obtained.

EXAMPLE 7

A mixture of 49 parts of perylene-3,4,9,10-tetracarboxylic acid dianhydride, 61 parts of 2,4-diamino-6-phenyl-1,3,5-triazine and 29 parts of zinc phenate is stirred with 60 parts of nitrobenzene at the boiling point (about 210–220° C.) with a stream of nitrogen passing for 5 hours. On cooling the product is filtered off and washed with ethanol. It is then suspended in about 5000 parts of dilute hydrochloric acid and stirred at 90–95° C. for 15 minutes. It is then filtered off, washed and dried. A product very similar to the product of Example 3 is so obtained, and it can be converted into pigmentary form as described in Example 1.

EXAMPLE 8

In the following table a series of substituted 1,3,5-triazines are listed against the shades of the pigments which are obtained from them by condensation with perylene tetracarboxylic acid dianhydride by methods described in the foregoing examples.

TABLE

| R | R₁ | Shade |
|---|---|---|
| NH₂ | CH₃NH— | Bluish red. |
| NH₂ | (CH₃)₂N— | Violet. |
| NH₂ | piperidino-type ring (CH₂—CH₂/CH₂/CH₂CH₂)N— | Bluish red. |
| NH₂ | phenyl-NH— | Red. |
| NH₂ | 2-Cl-phenyl-NH— | Bluish red. |
| NH₂ | 4-Cl-phenyl-NH— | Bright red. |
| NH₂ | 2,4-diCl-phenyl-NH— | Do. |
| NH₂ | 2-Cl,4-Cl-phenyl-NH— | Bluish red. |
| NH₂ | CH₃O-phenyl-NH— | Reddish violet. |
| NH₂ | C₂H₅O-phenyl-NH— | Do. |
| NH₂ | 2-OCH₃,4-Cl-phenyl-NH— | Bluish red. |
| NHCH₃ | NH-phenyl-Cl | Red. |
| NH₂ | acridinyl-N— | Violet. |
| CH₃·NH— (CH₃)₂N— | CH₃NH— (CH₃)₂N— | Maroon. Bright red. |
| phenyl-NH— | phenyl-NH— | Reddish violet. |
| NH₂ | Cl-phenyl- | Bluish red. |
| NH₂ | OH-phenyl- | Light maroon. |
| NH₂ | OH-naphthyl- | Red. |
| phenyl- | phenyl- | Maroon. |

1. A compound of the formula

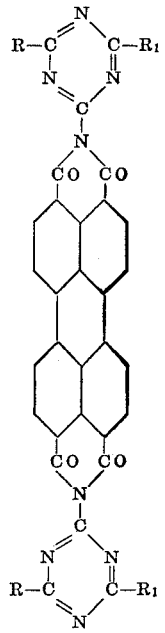

wherein R and R₁ are each selected from the group consisting of (a) amino, (b) amino substituted with 1–2 members of the class consisting of alkyl, hydroxyalkyl, alkoxyalkyl and chloroalkyl wherein the alkyl moiety in each contains from 1–4 carbon atoms, benzyl, phenyl, naphthyl, phenyl substituted with a member selected from the group consisting of alkyl having 1–4 carbon atoms, chloro, alkoxy having 1–4 carbon atoms and hydroxy, naphthyl substituted with a member selected from the group consisting of alkyl having 1–4 carbon atoms, chloro, alkoxy having 1–4 carbon atoms and hydroxy, (c) phenyl, (d) naphthyl, (e) phenyl substituted with a member selected from the group consisting of alkyl having 1–4 carbon atoms, chloro, alkoxy having 1–4 carbon atoms and hydroxy, (f) naphthyl substituted with a member selected from the group consisting of alkyl having 1–4 carbon atoms, chloro, alkoxy having 1–4 carbon atoms and hydroxy or (g) wherein one or both of R and R₁ are amino and both hydrogen atoms of the amino group are replaced by a divalent group which together with the nitrogen atom forms a heterocyclic ring selected from the group consisting of piperidino, morpholino and carbazyl.

2. The compound of claim 1 wherein R and R₁ are both amino groups.

3. The compound of claim 1 wherein one of R and R₁ is amino and the other is phenyl.

4. The compound of claim 1 wherein one of R and R₁ is amino and the other is anilino.

5. The compound of claim 1 wherein one of R and R₁ is amino and the other is p-chloroanilino.

6. The compound of claim 1 wherein one of R and R₁ is amino and the other is 2-hydroxynaphth-1-yl.

References Cited

UNITED STATES PATENTS

| | | | |
|---|---|---|---|
| 2,890,220 | 6/1959 | Eckert et al. | 260—281 |
| 2,905,686 | 12/1959 | Eckert et al. | 260—281 |
| 2,914,531 | 11/1959 | Staeuble et al. | 260—249.5 |
| 3,043,843 | 7/1962 | Koch | 260—281 |
| 3,238,217 | 3/1966 | Grogan et al. | 260—281X |

(Other references on following page)

UNITED STATES PATENTS 3,247,208   4/1966   Schenker _____ 260—281
3,357,983   12/1967   Weener et al. _____ 260—281

FOREIGN PATENTS 1,013,513   4/1952   France _____ 260—281

HENRY R. JILES, Primary Examiner

J. M. FORD, Assistant Examiner

U.S. Cl. X.R.

260—249.5, 249.9; 8—4, 162; 106—288, 292